(12) United States Patent
Ferris et al.

(10) Patent No.: US 9,202,225 B2
(45) Date of Patent: Dec. 1, 2015

(54) AGGREGATE MONITORING OF UTILIZATION DATA FOR VENDOR PRODUCTS IN CLOUD NETWORKS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 488 days.

(21) Appl. No.: 12/790,039

(22) Filed: May 28, 2010

(65) Prior Publication Data
US 2011/0295727 A1 Dec. 1, 2011

(51) Int. Cl.
| | |
|---|---|
| G07F 19/00 | (2006.01) |
| H04M 15/00 | (2006.01) |
| G06Q 30/02 | (2012.01) |
| G06F 11/34 | (2006.01) |
| G06Q 30/04 | (2012.01) |
| G06Q 40/00 | (2012.01) |

(52) U.S. Cl.
CPC ............ *G06Q 30/0201* (2013.01); *G06F 11/34* (2013.01); *G06Q 30/04* (2013.01); *G06Q 40/12* (2013.01); *G06F 11/3476* (2013.01); *G06F 11/3495* (2013.01)

(58) Field of Classification Search
CPC .............................. G06Q 30/04; G06Q 20/102
USPC .......................................................... 705/34
See application file for complete search history.

(56) References Cited

U.S. PATENT DOCUMENTS

| | | | |
|---|---|---|---|
| 6,463,457 B1 | 10/2002 | Armentrout et al. | |
| 7,203,168 B1 * | 4/2007 | Meggison et al. | ............ 370/231 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Seye Iwarere
(74) *Attorney, Agent, or Firm* — Lowenstein Sandler LLP

(57) ABSTRACT

Embodiments relate to systems and methods for the aggregate monitoring of utilization data for vendor products in cloud networks. A service can be abstracted and provided external to a set of cloud networks which can access the management system(s), vendor databases, or other resources in those clouds, and generate selective reports on application or other usage across those diverse cloud networks. A network user may wish to generate a report on the usage history of software or services in multiple host clouds, without establishing or accessing individual tracking servers or services in each of the host cloud networks. In aspects, the user may also wish to generate an aggregate report combining multiple vendors, user groups, software, or other attributes. The usage report(s) can be configured to use different criteria or generate different outputs on a dynamic basis, e.g. in different times frames, or altering reports under different usage conditions.

20 Claims, 6 Drawing Sheets

(56) References Cited

U.S. PATENT DOCUMENTS

| | | | |
|---|---|---|---|
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1* | 4/2008 | Dani et al. | 726/28 |
| 2008/0086727 A1 | 4/2008 | Lam et al. | |
| 2008/0091613 A1* | 4/2008 | Gates et al. | 705/59 |
| 2008/0104608 A1 | 5/2008 | Hyser et al. | |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0132695 A1 | 5/2009 | Surtani et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300210 A1 | 12/2009 | Ferris | |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2010/0042720 A1 | 2/2010 | Stienhans et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0088205 A1* | 4/2010 | Robertson | 705/34 |
| 2010/0094925 A1* | 4/2010 | St Jacques et al. | 709/202 |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0220622 A1 | 9/2010 | Wei | |
| 2010/0268632 A1* | 10/2010 | Rosenthal | 705/37 |
| 2010/0292556 A1* | 11/2010 | Golden | 600/364 |
| 2010/0299366 A1 | 11/2010 | Stienhans et al. | |
| 2010/0312817 A1* | 12/2010 | Steakley | 709/202 |
| 2010/0332401 A1* | 12/2010 | Prahlad et al. | 705/80 |
| 2011/0016214 A1 | 1/2011 | Jackson | |
| 2011/0022812 A1* | 1/2011 | Van der Linden et al. | 711/163 |
| 2011/0047540 A1* | 2/2011 | Williams et al. | 717/178 |
| 2011/0055385 A1* | 3/2011 | Tung et al. | 709/224 |
| 2011/0055399 A1* | 3/2011 | Tung et al. | 709/226 |
| 2011/0131335 A1 | 6/2011 | Spaltro et al. | |
| 2011/0131499 A1* | 6/2011 | Ferris et al. | 715/736 |
| 2011/0167474 A1* | 7/2011 | Sinha et al. | 726/1 |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

(56) References Cited

OTHER PUBLICATIONS

Morgan, "Systems and Methods for Self-Moving Operating System Installation in Cloud-Based Network", U.S. Appl. No. 13/149,877, filed May 31, 2011.
"rBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
DeHaan et al., "Methods and Systems for Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Cloud Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

AGGREGATE MONITORING OF UTILIZATION DATA FOR VENDOR PRODUCTS IN CLOUD NETWORKS

FIELD

The invention relates generally to systems and methods for the aggregate monitoring of utilization data for vendor products in cloud networks, and more particularly, to platforms and techniques for capturing usage data for users operating software products across diverse cloud networks, and generating selective usage reports on the operation of those products across arbitrary collections of clouds.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

As such, users or operators who wish to monitor the usage history of their diverse cloud-based application deployments may be confronted with a complicated series of tasks to capture application or service usage in the cloud. As one potentially complicating factor, the user may need to connect to multiple software vendor databases or repositories in multiple clouds to attempt to monitor collective software subscription rights. The user may further need to independently contact or register with cloud management systems which host the multiple or independent clouds to carry out usage monitoring activity. Each of the cloud management systems which support the user's various cloud networks may have different communication protocols, security requirements, application programming interfaces (APIs), and/or other specifications or formats. An administrator attempting to organize the collective usage activity of their end-user base across all operative clouds may therefore have to manually configure the connection to each supporting cloud management system or other usage monitoring service in local clouds. It may be desirable to provide systems and methods for aggregate monitoring of utilization data for vendor products in cloud networks, in which users based in any arbitrary host cloud or clouds can access an external service to determine the usage history, service levels, subscription arrangements, and other details of their cloud deployment footprint across all cloud environments.

DESCRIPTION

Figure 1:
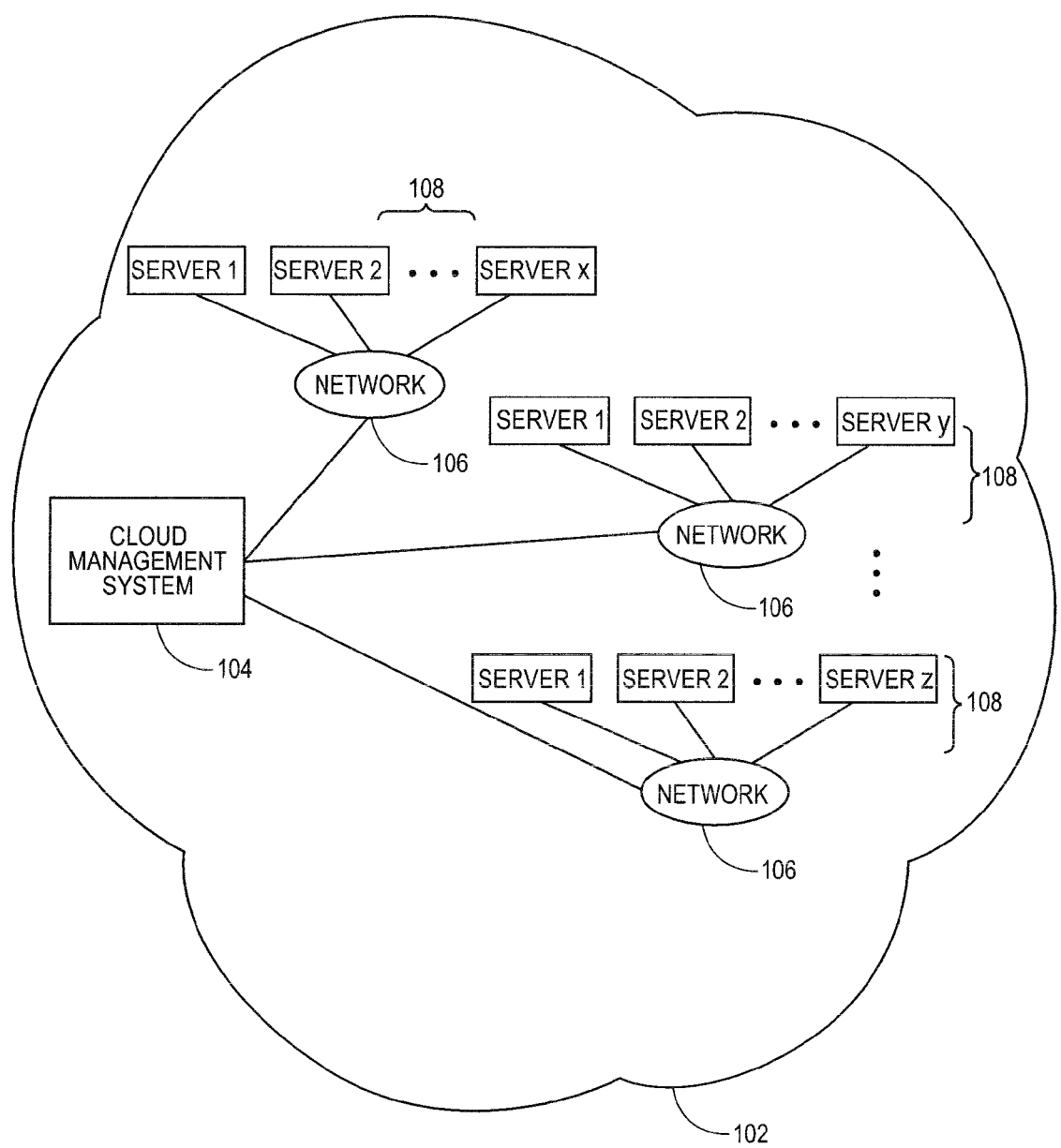
FIG. 1 illustrates an overall cloud system architecture in which various aspects of systems and methods for the aggregate monitoring of utilization data for vendor products in cloud networks can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will likewise realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
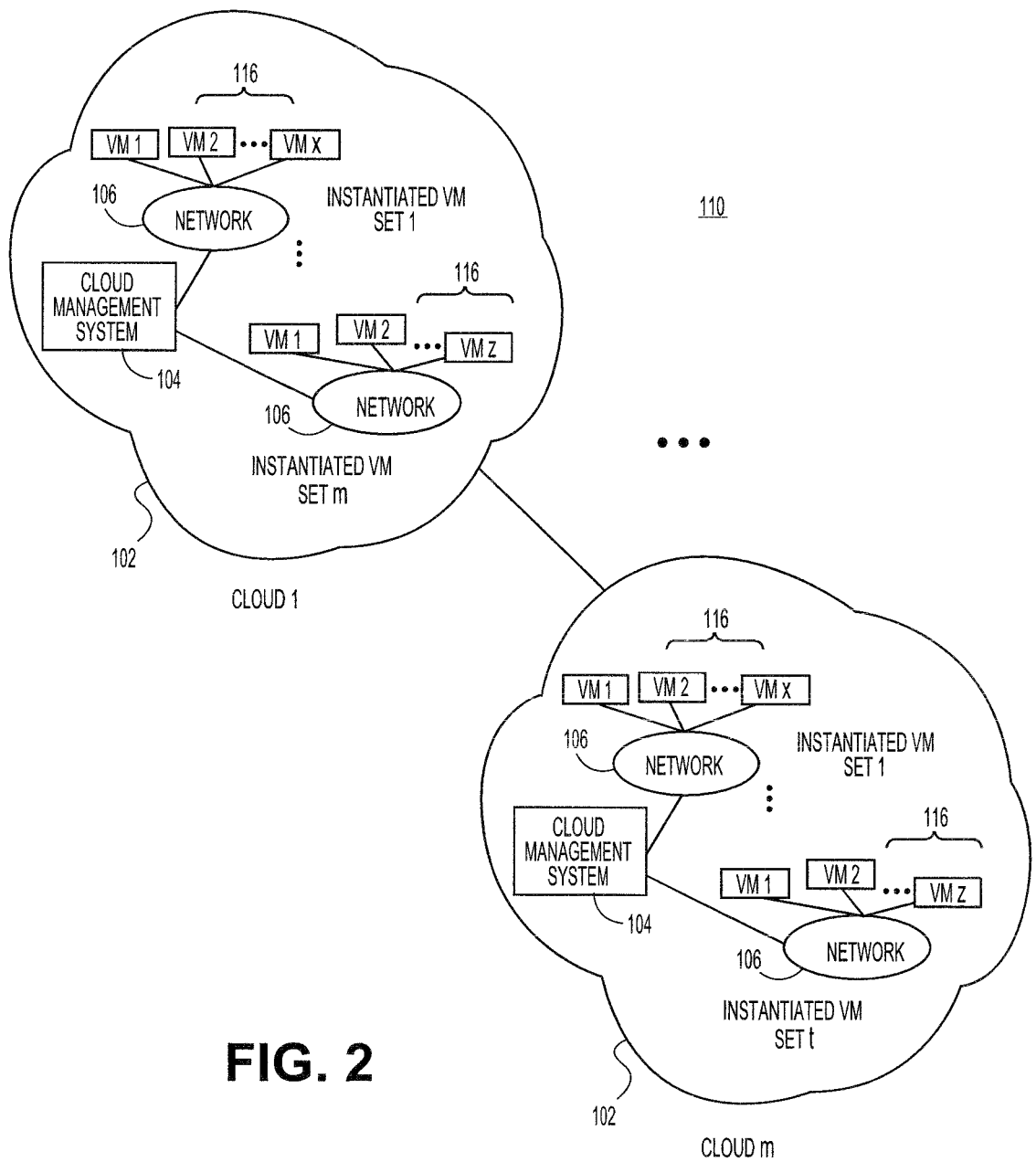
FIG. 2 illustrates an overall cloud system architecture including multiple cloud arrangements in which various aspects of systems and methods for the aggregate monitoring of utilization data for vendor products in cloud networks can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3:
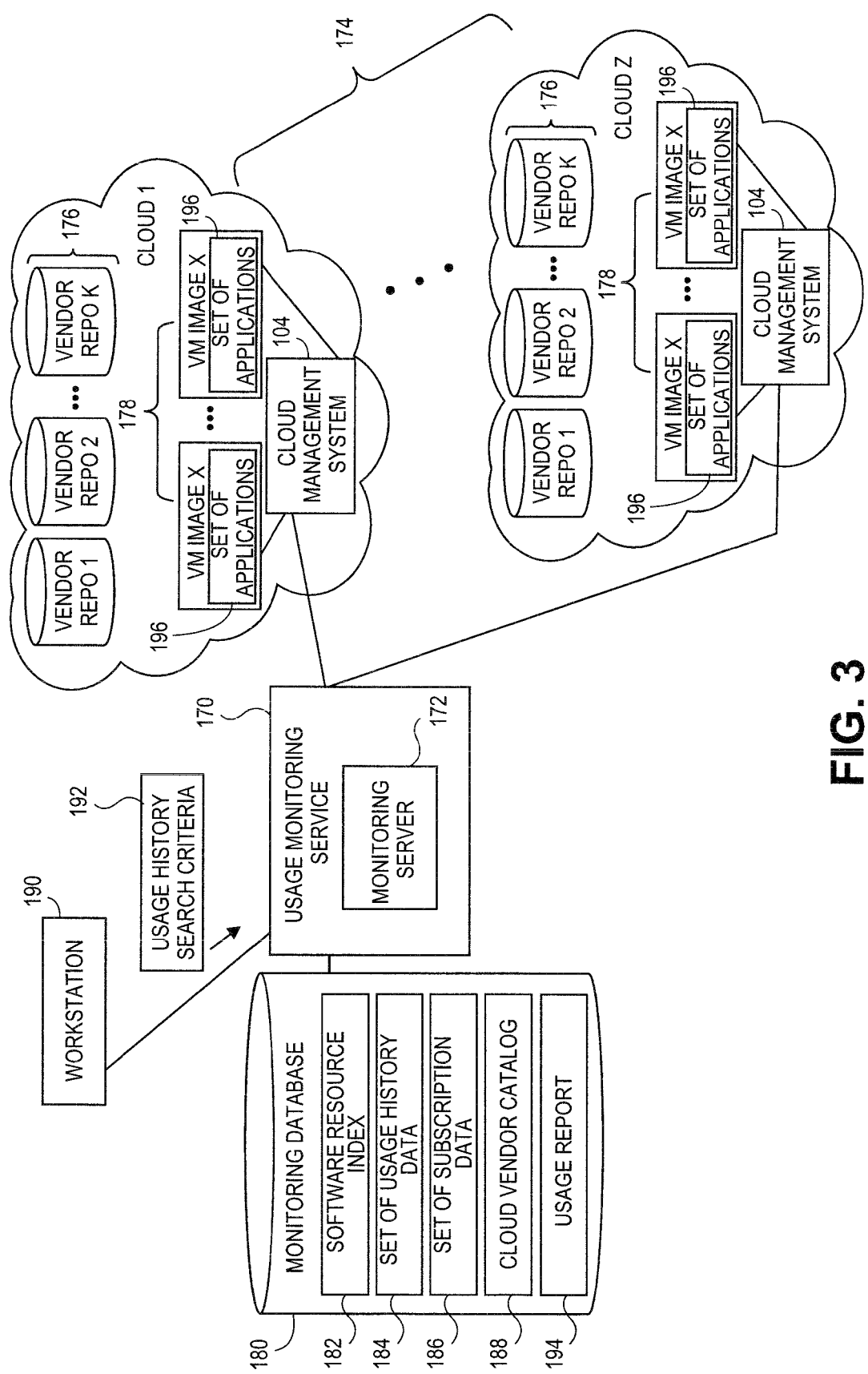
FIG. 3 illustrates a network configuration in which a usage monitoring service, monitoring database, and other resources can interact with a set of cloud management systems and host clouds, to perform various cloud usage monitoring functions across arbitrary cloud sets, according to various embodiments.

FIG. 3 illustrates an illustrative network configuration in which systems and methods for aggregate monitoring of utilization data for vendor products in cloud networks can be implemented, according to various embodiments. In embodiments as shown, a user can operate a set of virtual machines 178 in a set of host clouds 174, which can be multiple, independent, or separate cloud networks. In aspects, each cloud, or groups of clouds, in the set of host clouds 174 can have one or more associated cloud management system 104. In aspects, the set of virtual machines 178 operating in the set of host clouds 174 can comprise a set of virtual machines designed and configured to execute and support a set of applications 196 and/or services or processes in the set of host clouds 174. The set of virtual machines 178 can generally be configured, provisioned, instantiated, and controlled by their respective one or more cloud management systems 104, for instance as described herein. The set of applications 196 executing in the set of virtual machines 178 can be or include, such as, for example, transaction applications or services, messaging applications or services, database applications or services, and/or other appliances, applications, services, and/or other resources. In aspects, the set of virtual machines 178 themselves can be or include a set of virtual appliances, which can be, as understood by persons skilled in the art, special-purpose machines configured to perform one or more identified tasks, applications, or services.

In aspects as shown, the set of host clouds 174 can be configured to communicate with an external usage monitoring service 170 to perform usage history capture and other monitoring services. In embodiments, the usage monitoring service 170 may be supported by a monitoring server 172 and/or other hardware, software, or other resources located outside of the set of host clouds 174. Monitoring server 172 can comprise a server platform including processor, memory, software, and communications resources, as well as hard disk, optical, or other storage, as understood by persons skilled in the art. In embodiments, the usage monitoring service 170 can, for instance, be deployed or effected by software stored in computer-readable media hosted in monitoring server 172, and executed on that server and/or other machines or platforms. In further embodiments, the usage monitoring service 170 can in addition or instead be partially or wholly hosted in set of host clouds 174, or any cloud therein. In embodiments as shown, the usage monitoring service 170 can communicate with one or more cloud management systems 104 hosting or supporting one or more clouds in the set of host clouds 174 in which the user can maintain the set of virtual machines 178, the set of applications 196, and/or other resources. More specifically, the user can instantiate and operate the set of virtual machines 178, each of which in turn can host and execute the set of applications 196, such as messaging, browsing, security, and/or other applications, and/or other processes or services. In aspects, the set of virtual machines 178 can also host and execute an operating system and/or related operating system components, utilities, services, and extensions to support and operate set of applications 196 and/or other applications, software, or services. In embodiments, the usage monitoring service 170 can track the ownership and usage of the set of virtual machines 178, for instance by querying the set of cloud management systems 104 to identify virtual machines belonging to or associated with one or more users. The usage monitoring service 170 can also register and store software usage data for the set of applications 196 and/or other software or resources installed and/or operating in the set of virtual machines 178, and/or any selected users (including e.g. network-level or end-users) of those machines in set of host clouds 174. In aspects, the usage monitoring service can access and maintain a monitoring database 180 to store that usage data for analysis, reporting, and other purposes.

More particularly, and as likewise shown in FIG. 3, the usage monitoring service 170 can communicate with the set of host clouds 174 to capture and record details of the execution and operation of the set of applications 196 in one or more clouds 102 located in the set of host clouds 174. In aspects, the set of host clouds 174 can be identified or registered by user selection or input. In aspects, the set of host clouds 174 in addition or instead can be identified by automatic services or processes, for instance, by logic configured to perform a discovery process on the set of host clouds 174 to locate clouds hosting the set of virtual machines 178, and/or other machines, services, or processes belonging to a given user or vendor. In carrying out usage monitoring services, the usage monitoring service 170 can establish, access, and maintain a collection of information in the monitoring database 180 for purposes of building usage records for any desired application, service, cloud, vendor, location, user, and/or other attribute of executable software or other resources under management by monitoring service 170. In aspects, in order to collect and generate reports on that aggregated information, the monitoring database 180 can for instance record data including a software resource index 182, which can in general index or enumerate the applications, appliances, operating systems, and/or other software resources subscribed to or available to users of the usage monitoring service 170. The monitoring database 180 can also store a set of usage history data 184, which can comprise usage data for the set of applications 196 and their underlying set of virtual machines 178, usage data for users or groups of users, usage data for clouds in set of host clouds 174, and/or other usage information. The monitoring database 180 can likewise store a set of subscription data 186, which can for instance reflect the set of user access rights, service level agreements, subscription rates, and/or other operational entitlements for users of the set of applications 196, and/or other software or services executing in set of host clouds 174. The monitoring database 180 can acquire and store additional information including a cloud vendor catalog 188, which can for instance reflect the complete set of applications or other software available from one or more vendor, across all clouds of set of host clouds 174. The usage monitoring service 170 can access and analyze all the foregoing data components and/or other information to generate a usage report 194, which can also be stored in monitoring database 180. The usage report 194 can reflect a collective and/or selective slice through the potentially voluminous set of usage history data 184, and present a user, vendor, or other entity with reports on desired usage patterns and attributes directly via the usage monitoring service 170, without a necessity to individually access clouds in set of host clouds 174, the one or more cloud management systems 104 supporting those clouds, and/or other cloud resources. In embodiments, the monitoring database 180 can store other types, numbers, or configurations of data or records related to the usage of set of applications 196 and/or other resources in set of host clouds 174.

In aspects as shown, the usage monitoring service 170 can for instance acquire and store a set of usage history data 184 from the set of host clouds 174 indicating the application identity, duration of execution, usage times, usage peaks, and/or other attributes of the usage of any one or more application in a set of applications 196 hosted in one or more clouds in the set of host clouds 174. The set of usage history data 184 can also record, for instance, the identify of end-users operating or using an application in the set of applications 196, the bandwidth or computing power consumed by those users, the connections made by users of those applications, the Internet Protocol (IP) address obtained by browser or other applications operated by end-users, and other data related to the operation of the set of applications 196.

According to aspects, a user can supply the usage monitoring service 170 with credentials, such as user ID, password, certificates, and/or other credentials, necessary to log into or otherwise access one or more cloud management systems 104 and/or other platforms or services to which the user is registered. In aspects, the set of usage history data 184 can be captured by the usage monitoring service 170 using those credentials and/or other validation information, connections, or transactions to interrogate or interface to one or more cloud management systems 104 hosting the set of host clouds 174. In aspects, the one or more cloud management systems 104 can be configured to accept the credentials of the usage monitoring service 170, itself, to access usage data captured by those management systems, so that users can register to that service rather than individual clouds or their respective one or more cloud management systems 104. The interrogation, accessing, or receipt of usage data from the one or more cloud management systems 104 and/or other data sources can be configured to take place on a periodic, on-demand, event-triggered, and/or other basis to capture that usage data.

For example, the usage monitoring service 170 can communicate with one or more cloud management systems 104 which support the set of virtual machines 178, the set of applications 196, and/or applications, resources or services which a user or users wish to track and monitor. The usage monitoring service 170 can, in aspects, establish secure or other connections to one or more cloud management systems 104 and/or other platforms or services associated with any or all of the set of host clouds 174, to access and receive the set of usage history data 184 and other information related to the execution of the set of virtual machines 178 and set of applications 196 in that cloud or clouds. After the capture and recording of the set of usage history data 184 to the monitoring database 180, users, administrators, and/or others can query the monitoring database 180 to generate one or more usage report 194 reflecting usage details and comparisons between various applications, services, users, vendors, and/or other variables, on a selective basis and without regard to cloud boundaries or source vendors.

In aspects, to permit selective search, filtering and reporting on the set of usage history data 184, the usage monitoring service 170 can, in addition to obtaining recording the set of usage history data 184, capture and receive other information associated with the usage of the set of virtual machines 178, the set of applications 196, and/or other resources. That other associated information can include a software resource index 182, which can reflect the set of applications, appliances, services, and/or other software resources maintained or accessed by a user operating the set of applications 106 operating in the set of virtual machines 178, or otherwise. For example, for a corporate user maintaining a set of engineering applications for users in a research project, the software resource index 182 can record end-user IDs, cloud IDs, and the allocated technical or other software in the set of applications 196 registered to that group of end-users. In aspects, the software resource index 182 for a given user can be built, in part, by accessing a set of vendor repositories 176 maintained by software vendors, such as independent software vendors (ISVs). ISVs and/or other vendors can maintain a set of repositories 176 such as a server, distribution server, and/or other presence in those clouds in the set of host clouds 174 in which their products are available or accessible. The identification of software applications to which a given user may have entitlements can be derived, in aspects, from a set of subscription data 186 that can include subscription information received from the set of vendor repositories 176, from vendor Web sites, from users themselves, and/or from other sources. That set of subscription data 186 can likewise be imported to the monitoring database 180. The monitoring database 180 can likewise access or host one or more cloud vendor catalog 188 enumerating the set of all available applications or other software, services, database resources, and/or other resources provided by one or more vendors, generally.

In aspects as also shown, the usage monitoring service 170 can receive filtering or query criteria to interrogate the set of usage history data 184 to generate a usage report 194 indicating usage values, variables, trends, and/or other information of interest to a given user, users, vendors, and/or others. In aspects, a user such as a network-level user or subscriber, an administrator, an end-user, and/or other user can transmit a set of usage history search criteria 192 to the usage monitoring service 170, for instance via a local or remote workstation 190, as shown. The set of usage history search criteria 192 can include attributes, variables, filters, and/or other criteria with which to search the set of usage history data 184 and generate the usage report 194. For example, the set of usage history search criteria 192 can include the specification of criteria such as, for instance, criteria requesting the generation of a usage report for "User 4452" such as a corporate or other network-level or collective user, who operates application resources in "Cloud ID No. 101 and Cloud ID No. 144" for "User Group-Engineering" for those end-users in the defined user group operating "Application A, Application D, and Application E" for a period from "Date 1" to "Date 2." The application of the set of usage history search criteria 192 of that type or others to the set of usage history data 184 can be used by the usage monitoring service 170 to generate a usage report 194. The usage report 194 can list all identified end-users running those specified applications within those clouds in the desired time window. The usage report 194 can also, in aspects, include subscription information such as subscription costs for the executed applications over the desired time frame, and/or other billing, entitlement, or accounting details. In cases where the usage report 194 comprises billing, accounting, and/or other administrative reports or data, the usage monitoring service 170 can also access, apply, or search set of subscription data 186 to extract that information. According to aspects in further regards, a user can supply the set of usage history search criteria 192 to extract a report on all of the set of applications 196 for that user which are hosted or operate across all clouds in set of host clouds 174. According to aspects, the user can include their name, network address, and/or network identification in the set of usage history search criteria 192, to take an inventory of that user's overall software deployment, Conversely, according to aspects, a vendor can supply the set of usage history search criteria 192 to search for and identify all users who are operating that vendor's applications or other products in the set of host clouds 174. The vendor or other user can, for instance, enumerate the names or IDs of all that vendor's applications or other products in the set of usage history search criteria 192 to extract a list of executing or installed applications provided by that vendor in the set of host clouds 174. Other search criteria in the set of usage history search criteria 192 can be used.

It may be noted that in aspects, the usage report 194 can aggregate or selectively combine information for different subscribed applications across different clouds, as well as different vendors, users, virtual machines, applications, appliances, and/or other attributes or filters, without a need for the requesting user to register or communicate, or directly register or communicate, with each cloud producing that application or other resources activity. The usage monitoring service 170 can thereby, in aspects, abstract the capability to track application usage across cloud boundaries, vendor groups, user groups, and other demarcations. In aspects, the usage monitoring service 170 can itself represent a virtual machine and/or service, and can, in aspects, be instantiated in a cloud in the set of host clouds 174. Conversely, the usage monitoring service 170 can also or instead be installed or hosted in a cloud, platform, or site external to set of host clouds 174. Other configurations of the usage monitoring service 170 are possible.

Figure 4:
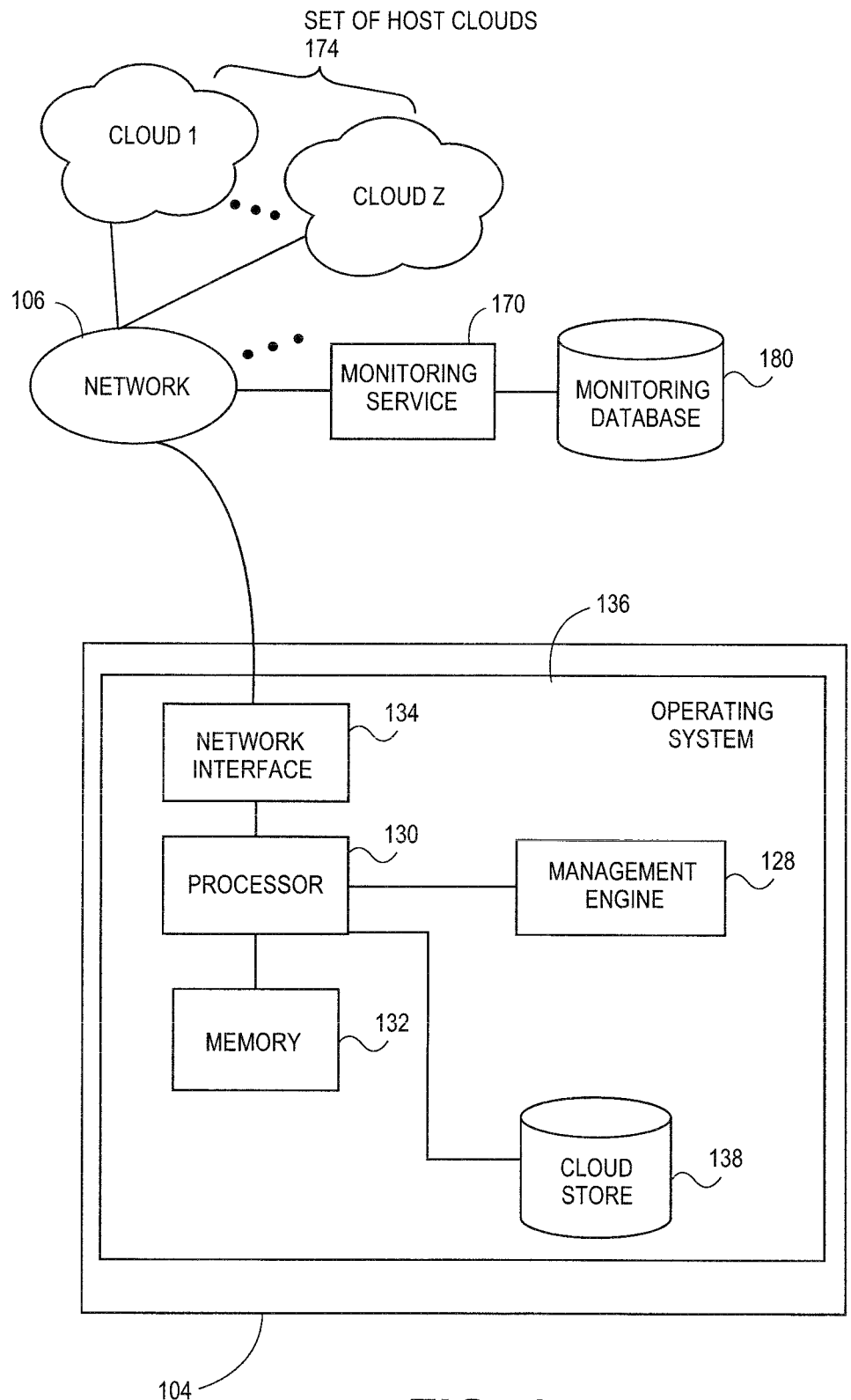
FIG. 4 illustrates an exemplary hardware configuration for a cloud management system that can support and maintain one or more cloud-based networks, according to various embodiments.

FIG. 4 illustrates an exemplary diagram of hardware and other resources that can be incorporated in a cloud management system 104 configured to communicate with the set of instantiated virtual machines 116, the set of virtual machines 178, and/or other entities or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, set of host clouds 174, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the usage monitoring service 170 via one or more networks 106, as well as the monitoring database 180, the set of virtual machines 178, the set of applications 196, the set of vendor repositories 176, and/or other network resources in any one or more cloud in the set of host clouds 174. Other configurations of the cloud management system 104, associated network connections, and other hardware, software, and service resources are possible. It may be noted that in embodiments, the monitoring server 172 and/or other hardware platforms or engines can comprise the same or similar resources as cloud management system 104.

Figure 5:
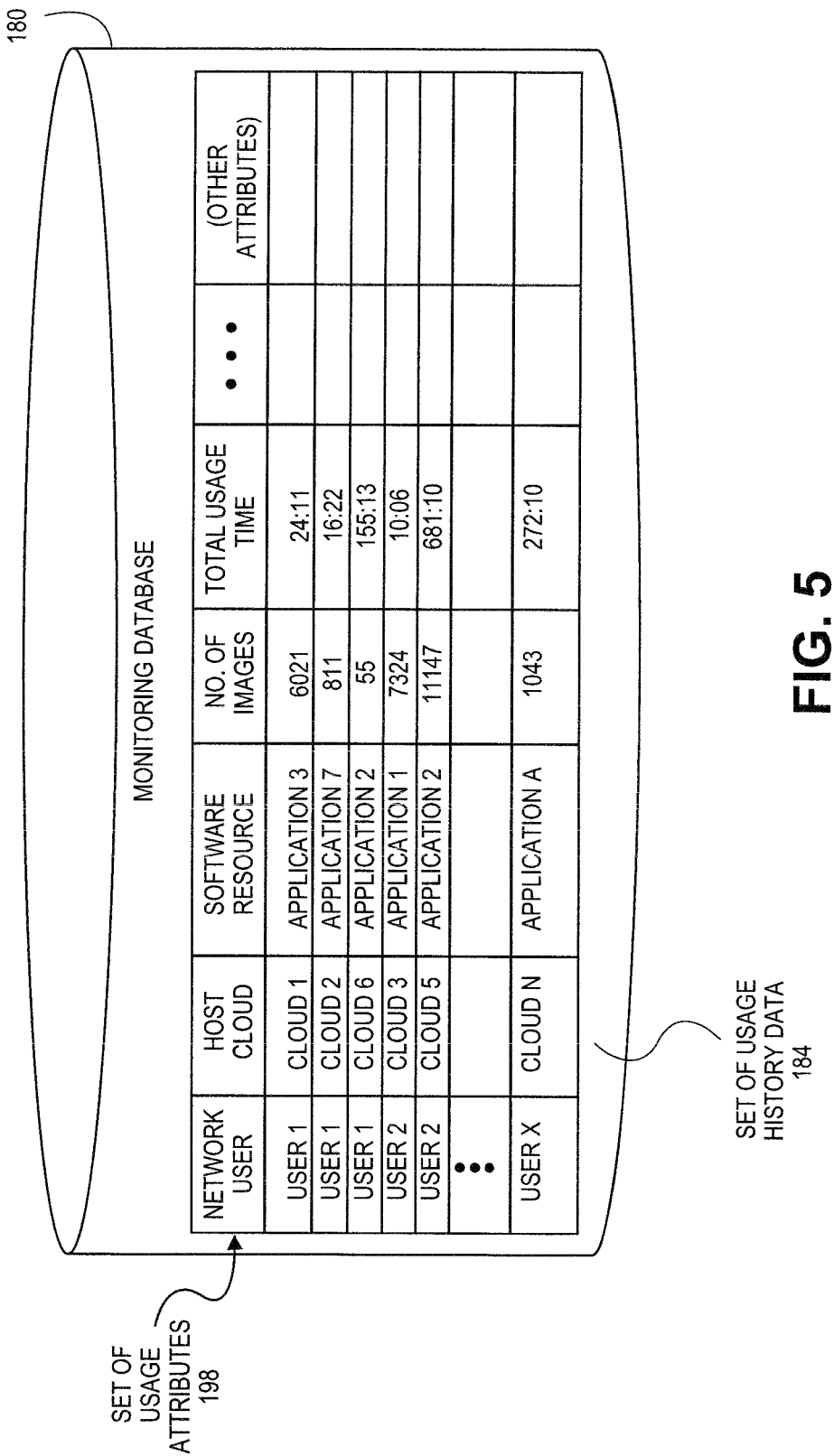
FIG. 5 illustrates an exemplary data structure in a monitoring database that can store usage-related information for users operating software applications and other cloud-based executable software resources, according to various embodiments.

FIG. 5 illustrates an exemplary data structure in which the set of usage history data 184 and/or other associated information can be encoded and stored in the monitoring database 180 or other data store, according to various aspects. In aspects as shown, the set of usage history data 184 can include and be organized using a set of usage attributes 198, for instance, organized as keys or columns recording various attributes of the usage history of the set of applications 196, and/or other executable software resources hosted in the set of host clouds 174. In aspects, the set of usage history data 184 can be recorded in a flat and/or relational database, as shown. When encoded as a relational database, the set of usage history data 184 can be organized around, for instance, a user ID field as a key field or first column in the set of usage attributes 198. When stored in a relational format with a key field or first column reflecting a user ID, the set of usage history data 184 can be further sorted based within user IDs to generate an order based on, for example, a given user's set of applications whose used was captured in the set of host clouds 174, as shown. The captured usage data for a given user can in addition or instead be organized or sorted on other attributes in the set of usage attributes 198, such as, for instance, based on elapsed usage time, number of application images or other instances, applicable operating system, end-user identities or groups of identities, and/or based on other single or joint attributes, criteria, or filters. In aspects, sorting operations on the set of usage history data 184 can be carried out by applying the set of usage history search criteria 192 received from a user and/or obtained from a service, application, and/or other automated or programmed source to generate usage report 194 and/or other output. In aspects, the monitoring database 170 can be, include, or access a SQL (structured query language) database engine, and the usage report 194 can be generated using queries received or executed in that protocol, or others. Other types, configurations, and formats of data can be used in the monitoring database 170, the set of usage history data 184, and/or other associated information.

Figure 6:
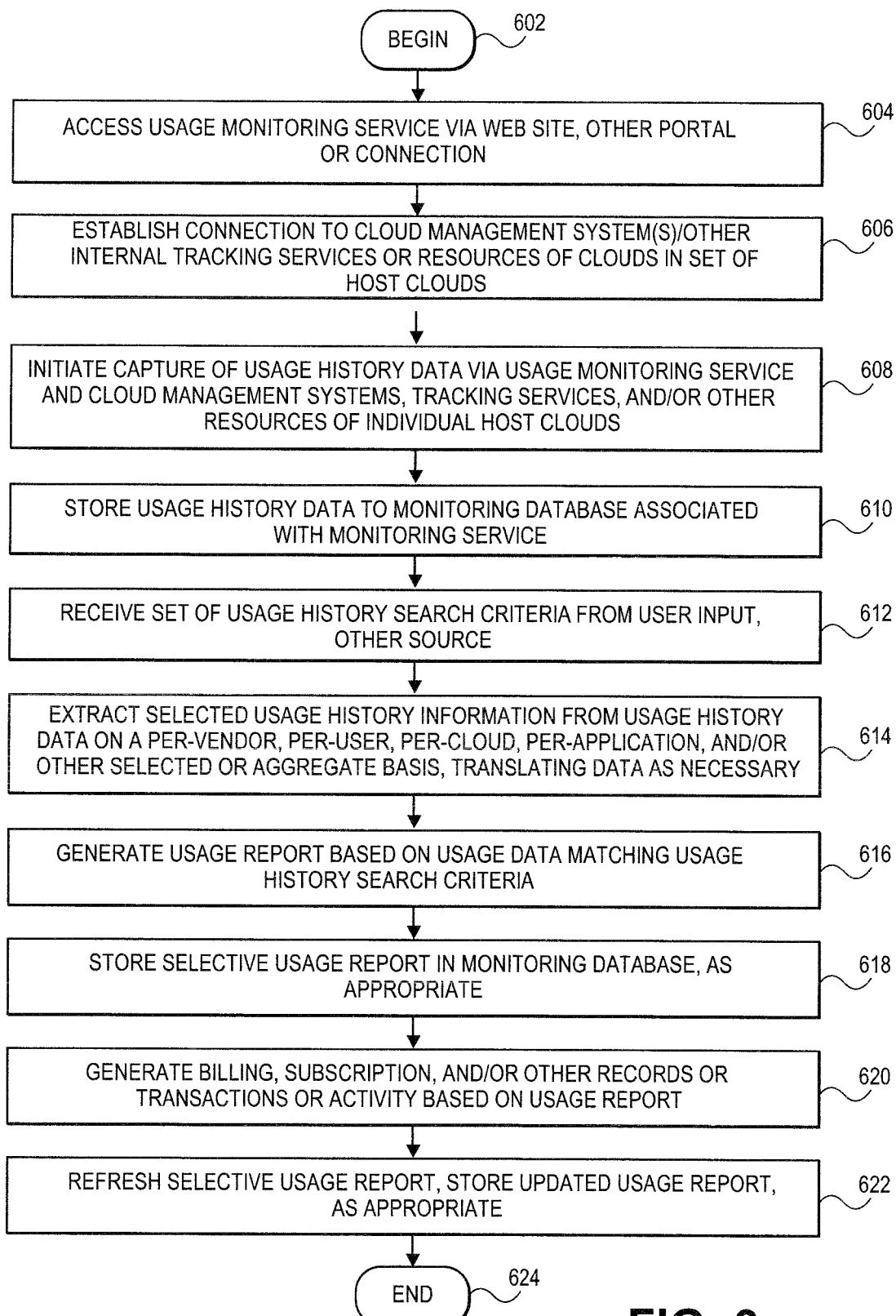
FIG. 6 illustrates a flowchart for processing the registration and tracking of multiple cloud-based applications or other resources for users from potentially diverse vendor sources in a multiple-cloud computing environment, according to various embodiments.

FIG. 6 illustrates a flowchart of overall processing to generate and manage services for the aggregate monitoring of utilization data for vendor products in cloud networks, according to various embodiments of the present teachings. In 602, processing can begin. In 604, a user, application, process, and/or service can initiate or access the usage monitoring service 170, such as by logging into or accessing an access-controlled Web site or other portal. In aspects, the user can be or include a network-level or higher-level user such as a network administrator, for instance, an administrator responsible for supervising the set of virtual machines 178 or other virtual network in the set of host clouds 174 for a corporation, educational, government, or other entity. It may also be noted that in aspects, the usage monitoring service 170 can be configured to operate autonomously, without requiring user login or access. In 606, the usage monitoring service 170 and/or other logic can establish a connection to one or more cloud management systems 104, and/or other internal tracking services or resources that may be hosted in individual clouds in the set of host clouds 174. For instance, the usage monitoring service 170 can establish a connection to the cloud management system 104 supporting one, two, or more cloud networks in the set of host clouds 174, and/or establish a connection to pre-existing or pre-deployed usage tracking platforms or services located in individual clouds in set of host clouds 174. Those internal cloud services, if present, may be established by one of more independent software vendors (ISVs), or other entities, and may operate in conjunction with one or more associated cloud management systems 104, or independently of any cloud management system.

In 608, the usage monitoring service 170 can initiate the capture of the set of usage history data 184 from the set of applications 196, and/or other executable software resources hosted in set of host clouds 174. In aspects, the usage monitoring service 170 can initiate the capture of the set of usage history data 184 by communicating with one or more cloud management systems 104, and/or other tracking systems or services or resources of respective constituent clouds. In 610, the usage monitoring service 170 can store the collected set of usage history data 184 to the monitoring database 180 associated with the usage monitoring service 170, and/or other local or remote storage. In 612, the usage monitoring service 170 can receive the set of usage history search criteria 192 from a user and/or other source, such as a service or an application configured to generate search terms for automated report purposes. In aspects, the set of usage history search criteria 192 can be or include a search term identifying a user, such as a corporation, government entity, and/or other network-level user or collective entity. The set of usage history search criteria 192 can also or instead include an identification of one or more software applications in the set of applications 196, and/or a specification of other cloud-based executable software resources, such as operating systems, appliances, and/or other software or services.

In aspects, the set of usage history search criteria 192 can also or instead include an identification of selected clouds, themselves, of software vendors, of hardware vendors, and/or other vendors, of geographic locations of users or other entities, and/or other search terms, filters, or criteria. It may be noted that in embodiments, any terms that may be included in the set of usage history search criteria 192 can be pre-applied or incorporated in the capture of the set of usage history data 184 so that, for instance, only the usage data for a given user, application, or vendor, among others, is initially captured from the set of host clouds 174. Other combinations of search terms or search criteria can be used, and those criteria can be applied at different times, stages, and/or under different conditions of the data capture or search processing.

In 614, the usage monitoring service 170 can apply the received search terms in the set of usage history search criteria 192 to the set of usage history data 184, to extract selected or specified usage history information on a per-vendor, per network-user, per end-user, per-cloud, per-application, and/or other selected, combined, or aggregate basis, as appropriate. In aspects, in order to extract and combine data from possibly disparate cloud-based networks in the set of host clouds 174, the usage monitoring service 170 can translate or conform usage data contained in the set of usage history data 184, as appropriate. For instance, the usage monitoring service 170 can translate data to ensure that data formats and data fields are consistent across multiple cloud providers, and/or one or more cloud management systems 104. For instance, if usage histories in two or more different clouds are recorded in two or more different currencies based on the set of subscription data 186 and different locations of end-users, the usage monitoring service 170 can conform that data to a common currency, format, or type. Other data reconciliation or reformatting can be performed by the usage monitoring service 170 on the set of usage history data 184 or any component of that data, as appropriate.

In 616, the usage monitoring service 170 can generate usage report 194 based on the results of applying the set of usage history search criteria 192 to set of usage history data 184, and/or other matching or filtering other information. The usage report 194 can for instance be generated in a database format such as SQL (structured query language), as Web-based transmissible code, such as XML (extensible markup language) code, and/or other formats. In 618, the usage report 194, or components of that report, can be stored to monitoring database 180 and/or other local or remote data store, as appropriate. In 620, the usage monitoring service 170 can generate a set of billing, subscription, and/or other records, transactions, and/or activity, based on usage report 194 and/or other information. For instance, in aspects, the usage monitoring service 170 and/or other services or logic can perform configuration management on the set of virtual machines 178, the set of applications 196, and/or other resources based on usage patterns identified in usage report 194. In 622, the usage monitoring service 170 can refresh the usage report 194 based on an updated version of the set of usage history data 184 and/or other information, as appropriate. In aspects, for instance, usage the monitoring service 170 can generate an updated or additional usage report 194 based on the following month of time after an original report, or based on other conditions, events, or criteria. In 624, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, set of virtual machines 178, and/or other machines, entities, services, or resources. For further example, while embodiments have been described in which one usage monitoring service 170 operates to access, track, and manage the usage history and software profile in the set of host clouds 174, in embodiments, multiple usage monitoring services can operate and cooperate to maintain usage data on a cross-cloud, cross-vendor, or other basis. Other resources described as singular or integrated can in embodiments be plural or distributed, and resources described as multiple or distributed can in embodiments be combined. The scope of the invention is accordingly intended to be limited only by the following claims.

What is claimed:

1. A method, comprising:
    receiving, by a processing device of a monitoring server, an identification of an application that is hosted by a first virtual machine in a first cloud-based network and a second virtual machine in a second cloud-based network, wherein the monitoring server is external to a first cloud management system that manages the first cloud-based network and to a second cloud management system that manages the second cloud-based network;
    aggregating, by the processing device of the monitoring server, a plurality of usage histories for the application in view of operation of the application across the first cloud-based network and the second cloud-based network;
    obtaining, by the processing device of the monitoring server, a software resource index and subscription data corresponding to the application, wherein the software resource index comprises an index of the application within a set of resources that are maintained by a user operating the application and subscribed by the user to the monitoring server, and wherein the subscription data comprises a set of at least one of user access rights, service level agreements, subscription rates, or entitlements at the monitoring server for the user operating the application;
    generating, by the processing device of the monitoring server, a usage report for the application in view of the plurality of usage histories, the obtained software resource index, and the obtained subscription data corresponding to the application;
    identifying, by the processing device, a usage pattern of the application in view of the usage report; and
    causing, by the processing device in view of the usage pattern, configuration management to be performed on at least one of the first virtual machine or the second virtual machine in view of the usage pattern, the configuration management to increase at least one of processing power, memory, or bandwidth corresponding to the at least one of the first virtual machine or the second virtual machine to adjust the usage pattern of the application.

2. The method of claim 1, wherein the plurality of usage histories comprises at least one of usage time of the application, a number of instances of the application, a number of registered users of the application, a number of support events associated with the application, an amount of bandwidth associated with usage of the application, or an amount of data consumption associated with the application.

3. The method of claim 1, wherein the identification of the application is received via at least one of user input or an automatically generated identification.

4. The method of claim 1, wherein at least a portion of the plurality of usage histories is received from a repository hosted by the first cloud-based network.

5. The method of claim 1, wherein the application comprises a plurality of applications.

6. The method of claim 5, wherein the plurality of applications are provided by a plurality of vendors.

7. The method of claim 6, wherein the usage report is generated in view of the plurality of applications.

8. The method of claim 7, wherein the generating of the usage report comprises applying a set of usage history search criteria to the plurality of usage histories.

9. The method of claim 8, wherein the usage report comprises a report generated on at least one of a per-vendor, per-application, or per-cloud basis in view of the set of usage history search criteria.

10. The method of claim 1, wherein the usage report comprises at least one of a billing report or a subscription report.

11. A system comprising:
    a network interface to a first cloud-based network and a second cloud-based network; and
    a processor, to communicate with the first cloud-based network and the second cloud-based network via the network interface, the processor to:
        receive an identification of an application that is hosted by a first virtual machine in the first cloud-based network and a second virtual machine in the second cloud-based network, wherein the system is external to a first cloud management system that manages the first cloud-based network and to a second cloud management system that manages the second cloud-based network;
        aggregate a plurality of usage histories for the application in view of operation of the application across the first cloud-based network and the second cloud-based network;

obtain a software resource index and subscription data corresponding to the application, wherein the software resource index comprises an index of the application within a set of resources that are maintained by a user operating the application and subscribed by the user to the monitoring server, and wherein the subscription data comprises a set of at least one of user access rights, service level agreements, subscription rates, or entitlements at the monitoring server for the user operating the application;

generate a usage report for the application in view of the plurality of usage histories, the obtained software resource index, and the obtained subscription data corresponding to the application;

identify a usage pattern of the application in view of the usage report; and cause, in view of the usage pattern, configuration management to be performed on at least one of the first virtual machine or the second virtual machine in view of the usage pattern, the configuration management to increase at least one of processing power, memory, or bandwidth corresponding to the at least one of the first virtual machine or the second virtual machine to adjust the usage pattern of the application.

12. The system of claim 11, wherein the plurality of usage histories comprises at least one of usage time of the application, a number of instances of the application, a number of registered users of the application, a number of support events associated with the application, an amount of bandwidth associated with usage of the application, or an amount of data consumption associated with the application.

13. The system of claim 11, wherein the application comprises a plurality of applications.

14. The system of claim 13, wherein the plurality of applications are provided by a plurality of vendors.

15. The system of claim 14, wherein the usage report is generated in view of the plurality of applications.

16. The system of claim 15, wherein the processor is further to apply a set of usage history search criteria to the set of usage histories to generate the usage report.

17. The system of claim 16, wherein the usage report comprises a report generated on at least one of a per-vendor, per-application, or per-cloud basis in view of the set of usage history search criteria.

18. The system of claim 11, wherein the usage report comprises at least one of a billing report or a subscription report.

19. The system of claim 11, wherein the identification of the application is received via at least one of user input or an automatically generated identification.

20. The system of claim 11, wherein at least a portion of the plurality of usage histories is received from a repository hosted by the first cloud-based network.

* * * * *